(12) United States Patent
Nogami et al.

(10) Patent No.: US 10,259,475 B2
(45) Date of Patent: Apr. 16, 2019

(54) RAILWAY WHEEL WITH BRAKE DISC

(71) Applicant: NIPPON STEEL & SUMITOMO METAL CORPORATION, Tokyo (JP)

(72) Inventors: Hiroshi Nogami, Takatsuki (JP); Takahiro Fujimoto, Kobe (JP); Yuiko Sakayama, Amagasaki (JP); Atsushi Sakaguchi, Nishinomiya (JP); Kazutaka Asabe, Sanda (JP)

(73) Assignee: NIPPON STEEL & SUMITOMO METAL CORPORATION, Tokyo (JP)

( * ) Notice: Subject to any disclaimer, the term of this patent is extended or adjusted under 35 U.S.C. 154(b) by 38 days.

(21) Appl. No.: 15/113,849

(22) PCT Filed: Feb. 3, 2015

(86) PCT No.: PCT/JP2015/000465
§ 371 (c)(1),
(2) Date: Jul. 25, 2016

(87) PCT Pub. No.: WO2015/122148
PCT Pub. Date: Aug. 20, 2015

(65) Prior Publication Data
US 2016/0339932 A1    Nov. 24, 2016

(30) Foreign Application Priority Data

Feb. 12, 2014  (JP) ................. 2014-024784

(51) Int. Cl.
*F16D 65/12* (2006.01)
*B61H 5/00* (2006.01)
(Continued)

(52) U.S. Cl.
CPC ............. *B61H 5/00* (2013.01); *B60B 17/00* (2013.01); *B60B 17/0006* (2013.01);
(Continued)

(58) Field of Classification Search
CPC .... F16D 65/124; F16D 65/123; F16D 65/128; B61H 5/00; B61H 11/14
See application file for complete search history.

(56) References Cited

U.S. PATENT DOCUMENTS

| | | | | |
|---|---|---|---|---|
| 2,320,086 A | * | 5/1943 | Ledwinka | B61H 5/00 105/182.1 |
| 3,143,191 A | * | 8/1964 | Stacy | B61H 5/00 188/153 A |
| 5,379,869 A | * | 1/1995 | Fox | F16D 65/124 188/218 XL |

FOREIGN PATENT DOCUMENTS

| | | | |
|---|---|---|---|
| DE | 3603280 A1 * | 8/1987 | ............ B60B 17/00 |
| DE | 19617684 | 12/1996 | |

(Continued)

*Primary Examiner* — Bradley T King
*Assistant Examiner* — Stephen M Bowes
(74) *Attorney, Agent, or Firm* — Clark & Brody (57) ABSTRACT

A railway wheel includes: a wheel including a plate portion; and a brake disc including a circular plate portion whose front face side is a sliding surface, and a plurality of fin portions which are radially projected on a back face of the circular plate portion, wherein two of the brake discs are fastened in a region within the sliding surface. Regarding an area of a section crossing a space between the brake disc and the wheel along a circumferential direction, a minimum section portion in which the sectional area is minimum is present in a region formed by an outer peripheral surface of the circular plate portion and an inner peripheral surface of the rim portion, and the outer peripheral surface of the circular plate portion follows the inner peripheral surface of the rim portion in a region extending to the outer side from the minimum section portion.

7 Claims, 9 Drawing Sheets

(51) Int. Cl.
*B60B 17/00* (2006.01)
*F16D 65/00* (2006.01)
*F16D 65/02* (2006.01)

(52) U.S. Cl.
CPC ......... *F16D 65/0006* (2013.01); *F16D 65/12* (2013.01); *F16D 65/124* (2013.01); *F16D 2065/138* (2013.01); *F16D 2065/1312* (2013.01); *F16D 2065/1328* (2013.01); *F16D 2065/1392* (2013.01)

(56) References Cited

FOREIGN PATENT DOCUMENTS

| EP | 216534 A | * | 4/1987 | ........... F16D 65/124 |
|----|----------|---|--------|-------------------------|
| GB | 1359388 A | * | 7/1974 | ........... F16D 65/124 |
| GB | 2130321 A | * | 5/1984 | ........... F16K 65/124 |
| JP | 10-167067 | | 6/1998 | |
| JP | 2006-009862 | | 1/2006 | |
| JP | 2007-205428 | | 8/2007 | |
| WO | 2010/071169 | | 6/2010 | |

\* cited by examiner

FIG. 1A

PRIOR ART

FIG. 1B

PRIOR ART

FIG. 2A

PRIOR ART

FIG. 2B

PRIOR ART

FIG. 2C

PRIOR ART

FIG. 3A

PRIOR ART

FIG. 3B

PRIOR ART

PRIOR ART

FIG. 9B

PRIOR ART

RAILWAY WHEEL WITH BRAKE DISC

TECHNICAL FIELD

The present invention relates to a railway wheel with brake disc (hereafter, also referred to as a "railway wheel with BD"), in which brake discs are fastened to a wheel for a railway vehicle.

BACKGROUND ART

As a braking system for railway vehicles, disc brakes which have excellent braking performance become more frequently used as the speed of vehicle and the size thereof increase. A disc brake is configured such that a brake lining is pressed against a sliding surface of a brake disc attached to a wheel. As a result, braking force is generated in a rotating wheel, thereby controlling the speed of vehicle.

The type of disc brake includes a center-fastening type (sliding-surface fastening type) brake disc in which brake discs are fastened to a wheel in a region within a sliding surface, and an inner-circumference fastening type brake disc in which brake discs are fastened to a wheel in a region located closer to the inner circumference than the sliding surface is. The inner-circumference fastening type brake disc requires a portion to be used for fastening, aside from a portion including a sliding surface. On the other hand, the center-fastening type brake disc does not need to be provided with such a portion to be used for fastening, and therefore is advantageous in weight reduction.

Figure 1A:
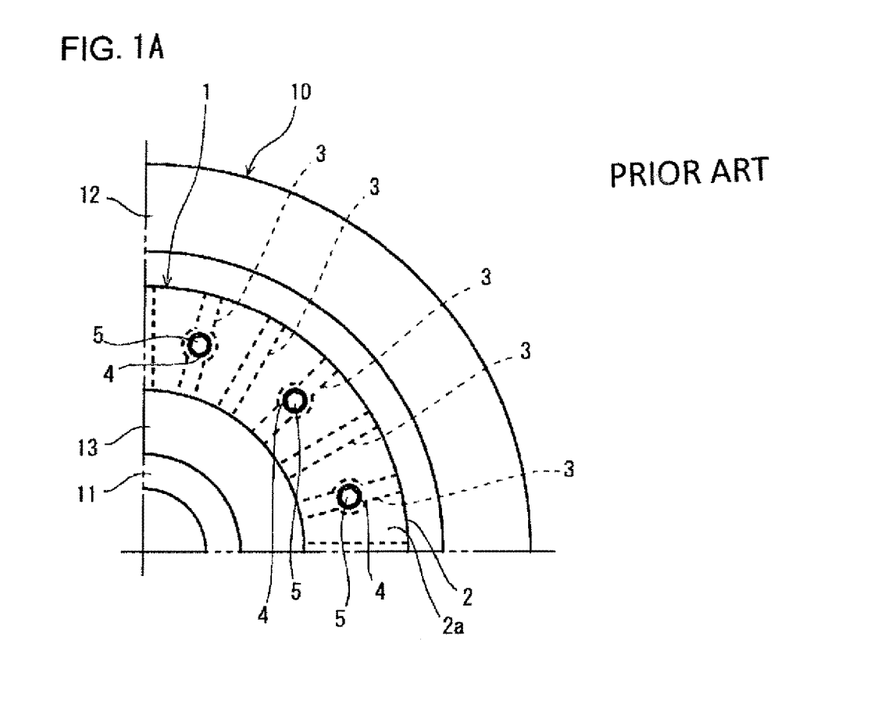
FIG. 1A is a diagram to show an overall structure of a railway wheel with brake disc, showing a plan view of a ¼ circular portion.
Figure 1B:
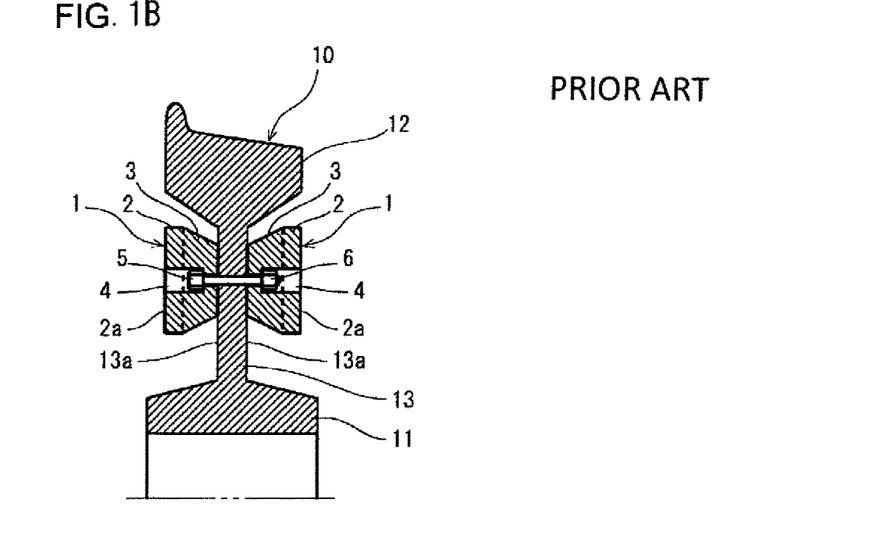
FIG. 1B is a diagram to show an overall structure of a railway wheel with brake disc, showing a sectional view along the radial direction of a semi-circular portion.
Figure 2A:
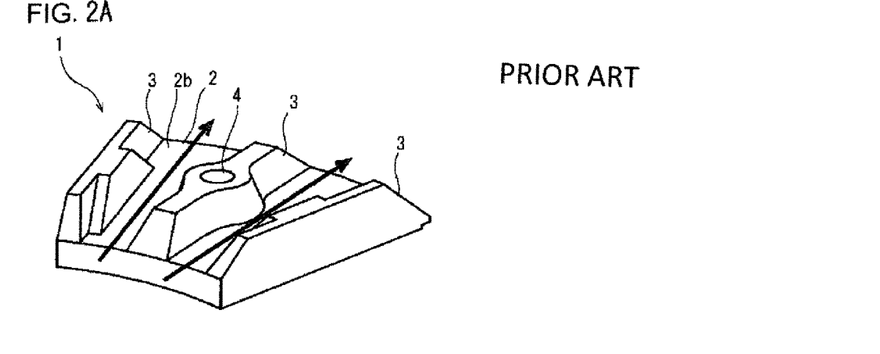
FIG. 2A is a diagram to topically show a structure of a conventional railway wheel with brake disc, showing a perspective view of the back face of the brake disc seen from the inner peripheral surface side.
Figure 2B:
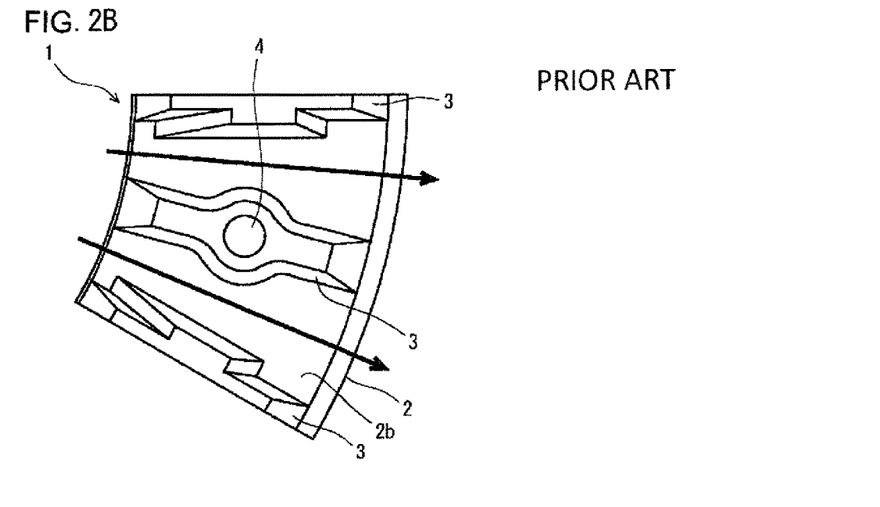
FIG. 2B is a diagram to topically show a structure of a conventional railway wheel with brake disc, showing a plan view of the brake disc seen from the back face side.
Figure 2C:
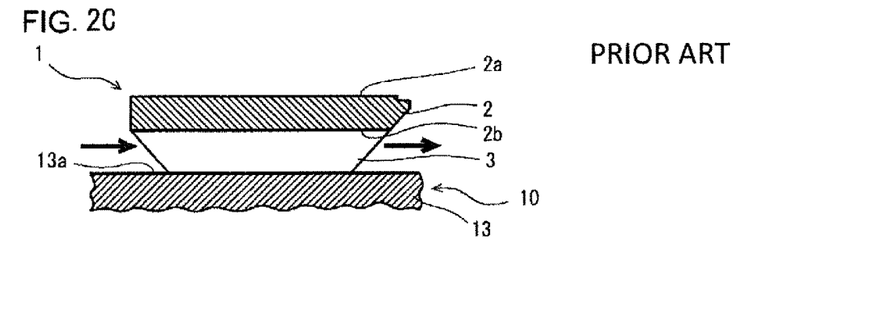
FIG. 2C is a diagram to topically show a structure of a conventional railway wheel with brake disc, showing a sectional view along the radial direction.

FIGS. 1A and 1B are diagrams to show an overall structure of a railway wheel with brake disc constituting a disc brake for a railway vehicle, in which FIG. 1A shows a plan view of a quarter circle portion, and FIG. 1B shows a sectional view along the radial direction of a half circle portion, respectively. FIGS. 2A to 2C are diagrams to topically show the structure of a conventional railway wheel with BD, in which FIG. 2A shows a perspective view of a back face of a brake disc seen from the inner peripheral surface side, FIG. 2B shows a plan view of a brake disc seen from a back face side, and FIG. 2C shows a sectional view along the radial direction, respectively. All of the brake discs shown in FIGS. 1A, 1B, and 2A to 2C are of center-fastening type.

As shown in FIGS. 1A, 1B, and 2A to 2C, a brake disc 1 includes an annular circular plate portion 2 whose front face 2a provides the sliding surface. In the back face 2b of the circular plate portion 2, a plurality of fin portions 3 are projected in a radial manner. In some of the plurality of fin portions 3, a bolt hole 4 passing through to the circular plate portion 2 is formed at an approximately central position in the radial direction.

A wheel 10 includes a boss portion 11 into which an axle shaft is to be press fit, a rim portion 12 including a tread which is to be in contact with a rail, and a plate portion 13 for combining them together. The brake discs 1 are disposed in a set of two so as to interpose the plate portion 13 of the wheel 10 therebetween with the front face 2a of each brake disc facing outwardly. A bolt 5 is inserted into each bolt hole 4, and a nut 6 is screwed onto each bolt 5 and fastened thereto. As a result, the brake disc 1 is fastened to the wheel 10 in such a way that a front end surface of the fin portion 3 is in pressure contact with a side face 13a of the plate portion 13 of the wheel 10 over the entire range of the radial direction.

The brake disc 1 is fastened to the plate portion 13 in a region within the sliding surface. In the center-fastening type brake disc, regarding the radial direction of the brake disc 1, it is preferable that the brake disc 1 is fastened to the wheel 10 in the vicinity of a central portion between the inner circumference and the outer circumference of the brake disc 1, for example, a portion between a position to internally divide the inner circumference and the outer circumference into a ratio of 1:3, and a position to internally divide the inner circumference and the outer circumference into a ratio of 3:1.

Substantially the entire surface of the front face of the brake disc 1 serves as a sliding surface, and as shown in FIG. 1B, a large gap (for example, a gap of 70 to 120 mm) is formed over the entire circumference between the boss portion 11 and the circular plate portion 2. That is, the brake disc 1 does not extend to the vicinity of the boss portion 11, thus realizing weight reduction of the brake disc 1. A conventional railway wheel with BD having such a configuration is disclosed in, for example, Patent Literature 1.

While a railway vehicle is travelling, the brake disc 1 rotates integrally with the wheel 10 at a high speed. Accordingly, air around the brake disc 1 flows from the inner circumference side (a gap between the boss portion 11 and the circular plate portion 2) into a space formed between the brake disc 1 and the wheel 10, specifically, a space surrounded by the circular plate portion 2 and the fin portion 3 of the brake disc 1, and the plate portion 13 of the wheel 10, and flows out from the outer circumference side (see solid arrows in FIGS. 2A to 2C). That is, while the railway vehicle is travelling, a gas flow of air occurs in a space between the brake disc 1 and the wheel 10. Such a gas flow becomes significant when the vehicle travels at a high speed of more than 300 km/h, like a high-speed railway vehicle such as the Shinkansen (R), thereby inducing noise referred to as aerodynamic sound. For that reason, reduction of aerodynamic sound is required from consideration of the environment.

In an inner-circumference fastening type brake disc, the gap between the boss portion 11 and the circular plate portion 2 is very small compared with a center-fastening type brake disc. For that reason, while the vehicle is travelling, the amount of air that flows into the space surrounded by the circular plate portion 2 and the fin portion 3 of the brake disc 1, and the plate portion 13 of the wheel 10 is small, and generally aerodynamic sound at a level that causes a problem will not be generated. Therefore, it can be said that the generation of aerodynamic sound is a problem peculiar to the center-fastening type brake disc.

Prior arts that address the need to reduce aerodynamic sound associated with a center-fastening type brake disc include the followings.

For example, Patent Literature 2 discloses a railway wheel with BD, in which a brake disc is additionally provided with a rib between adjacent fin portions along the circumferential direction so that the gas flow is suppressed by the rib. According to the railway wheel with BD disclosed in the above described literature, it is possible to reduce the aerodynamic sound to a desired level.

However, in the technique disclosed in Patent Literature 2, cooling performance for the brake disc during braking deteriorates as the gas flow is suppressed by the rib. For this reason, increases in the deformation caused by thermal expansion of the brake disc, and in the stress load inflicted upon the fastening bolt thereby, coupled with increase in the stiffness of the brake disc itself due to the addition of the ribs may cause a risk that durability of the brake disc and the bolt deteriorates.

A prior art to solve this problem is disclosed in Patent Literature 3.

Figure 3A:
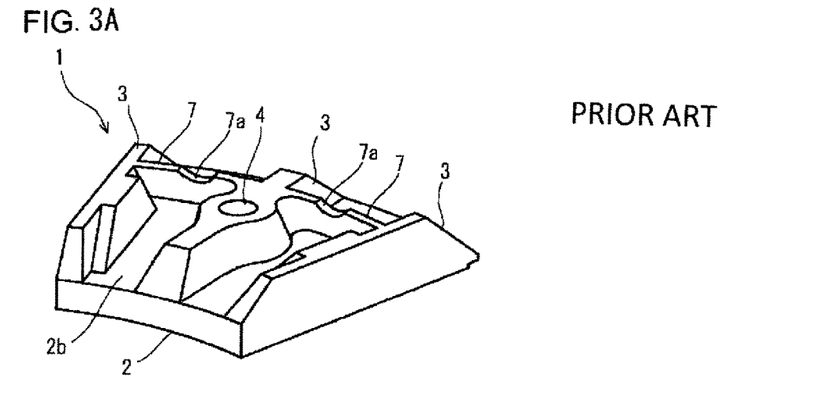
FIG. 3A is a diagram to topically show a structure of a conventional railway wheel with brake disc disclosed in Patent Literature 3, showing a perspective view of the back face of the brake disc seen from the inner peripheral surface side.
Figure 3B:
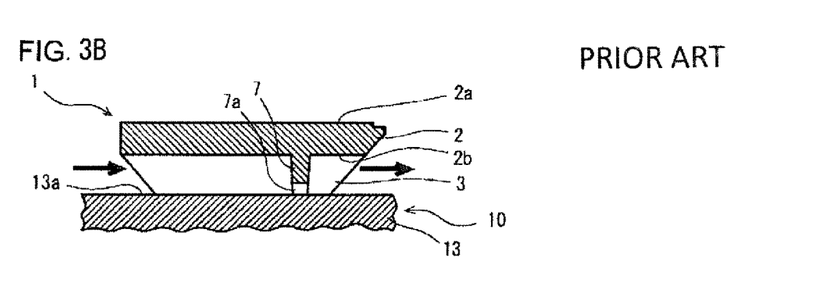
FIG. 3B is a diagram to topically show a structure of a conventional railway wheel with brake disc disclosed in Patent Literature 3, showing a sectional view along the radial direction.

FIGS. 3A and 3B are diagrams to topically show the structure of a conventional railway wheel with BD disclosed in Patent Literature 3, in which FIG. 3A shows a perspective view of a back face of a brake disc seen from its inner peripheral surface side, and FIG. 3B shows a sectional view along the radial direction. As shown in these figures, in the railway wheel with BD disclosed in Patent Literature 3, the brake disc 1 is added with ribs 7 in the circumferential direction each between adjacent fin portions 3, and further a slit 7a is formed along the radial direction in a central portion in the circumferential direction of each rib 7.

According to this railway wheel with BD, a gas flow is ensured by the slit 7a. Since this allows to maintain the cooling performance for the brake disc 1 during braking, and to lighten the increase in stiffness due to addition of the rib, deformation accompanying thermal expansion of the brake disc 1 and stress load inflicted on the fastening bolt are mitigated, thereby suppressing the deterioration in the durability of the brake disc 1 and the bolt.

CITATION LIST

Patent Literature

Patent Literature 1: Japanese Patent Application Publication No. 2006-9862
Patent Literature 2: Japanese Patent Application Publication No. 2007-205428
Patent Literature 3: International Application Publication No. WO2010/071169

SUMMARY OF INVENTION

Technical Problem

As described so far, a conventional railway wheel with BD for reducing aerodynamic sound is configured such that a rib is added in the circular plate portion of the disc brake, and further a slit is formed on the rib with the aim of suppressing the gas flow in a space surrounded by the circular plate portion and the fin portion of the brake disc, and the plate portion of the wheel. As a result of that, the shape of the brake disc becomes complicated, thus inevitably leading to deterioration in productivity of the brake disc.

Specifically, since additional work (machining, etc.) to adjust the heights of not only the fin portion but also the rib becomes necessary, and further additional work to form a slit in the rib becomes necessary, the production process of the brake disc becomes complicated. Particularly, when the brake disc is produced by forging, the load on the die increases, shortening of die life will be undeniable.

The present invention has been made in view of the above described problems, and has its objective to provide a railway wheel with brake disc having the following characteristics.
    The brake disc has a simple shape and an excellent productivity.
    The aerodynamic sound during high speed travelling is effectively reduced.

Solution to Problem

A railway wheel with brake disc of an embodiment of the present invention includes:
    a wheel for a railway vehicle including a boss portion, a rim portion, and a plate portion for combining them together; and
    a brake disc including an annular circular plate portion whose front face provides a sliding surface, and a plurality of fin portions which are radially projected on a back face of the circular plate portion, wherein
    two of the brake discs interpose the plate portion of the wheel with each of sliding surfaces thereof facing outwardly, and are fastened in a region within the sliding surface, and wherein
    regarding an area of a section crossing a space formed between the brake disc and the wheel along a circumferential direction, a minimum section portion in which the sectional area is minimum is present in a region formed by an outer peripheral surface of the circular plate portion and an inner peripheral surface of the rim portion, and
    the outer peripheral surface of the circular plate portion has a shape that follows the inner peripheral surface of the rim portion in a region extending to an outer side from the minimum section portion.

In the above described railway wheel with BD, the configuration may be such that the inner peripheral surface of the rim portion includes a corner surface connecting to a side face of the rim portion, and a fillet surface connecting to the corner surface and a side face of the plate portion, wherein the minimum section portion is present at a boundary between the corner surface and the fillet surface within the inner peripheral surface of the rim portion.

In the above described railway wheel with BD, the configuration may be such that the inner peripheral surface of the rim portion includes a corner surface connecting to a side face of the rim portion, and a fillet surface connecting to the corner surface and a side face of the plate portion, wherein the minimum section portion is present in a region of the fillet surface within the inner peripheral surface of the rim portion. In the case of this configuration, the minimum section portion is preferably present closest to the back face within the outer peripheral surface of the circular plate portion.

Moreover, in the above described railway wheel with BD, a configuration may be adopted in which the corner surface of the inner peripheral surface of the rim portion has a contour of arc shape in a section along the axial direction.

Advantageous Effects of Invention

The railway wheel with brake disc of the present invention has the following remarkable effects:
    The brake disc has a simple shape and an excellent productivity; and
    The aerodynamic sound during high speed travelling can be effectively reduced.

DESCRIPTION OF EMBODIMENTS

As described in Patent Literature 3, there is a strong correlation between the flow rate of the air, which flows through a space formed between the brake disc and the wheel, particularly, a space surrounded by the circular plate portion and the fin portion of the brake disc and the plate portion of the wheel, and the level of aerodynamic sound.

Figure 4:
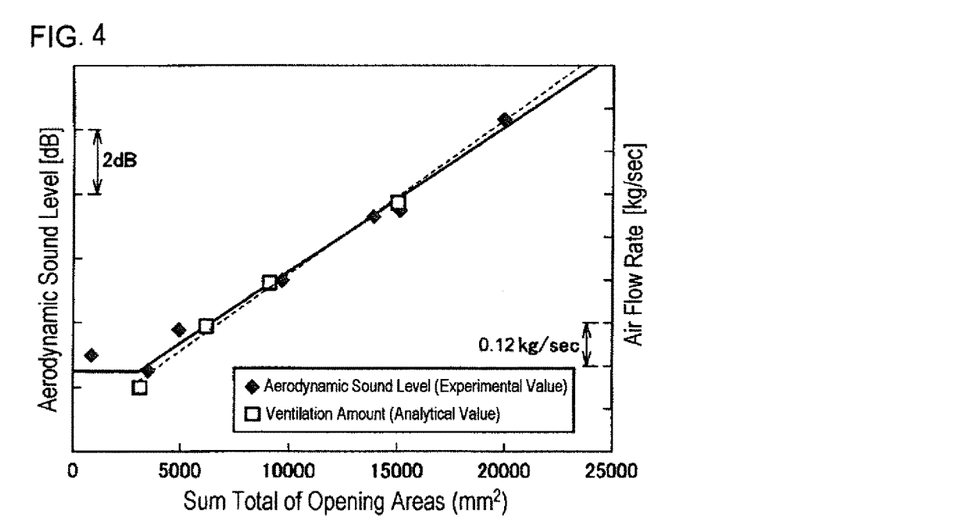
FIG. 4 is a diagram to show a correlation between the sum total of opening areas, and the aerodynamic sound level and the air flow rate in a railway wheel with brake disc.

FIG. 4 is a diagram to show a correlation between the sum total of opening areas, and the aerodynamic sound level and the air flow rate in the railway wheel with brake disc. The sum total of opening areas mentioned herein refers to a sum total of opening areas over the entire range of the circumferential direction when seen from the inner circumferential side of the brake disc regarding a space surrounded by the circular plate portion and the fin portion of the brake disc, and the plate portion of the wheel. In other words, the sum total of opening areas refers to an area of a minimum section portion in which area of the spatial cross section is minimum regarding a section (hereafter, referred to as a "spatial cross section") that crosses along the circumferential direction the space formed between the brake disc and the wheel. For example, like a railway wheel with BD shown in FIGS. 3A and 3B, in a case in which a rib is added between fin portions of the brake disc, and a slit is formed in the rib, since the minimum section portion is located at the position of the rib, the area of the spatial cross section at the position of the rib corresponds to the sum total of opening areas shown in FIG. 4. Note that the air flow rate has been obtained by a heat transfer and flow analysis (per one brake disc), and the level of aerodynamic sound has been obtained by experiment.

It is seen as shown in FIG. 4 that the aerodynamic sound level increases as the area (sum total of opening areas) of the minimum section portion increases, and the air flow rate shows a similar tendency.

However, in reality, the aerodynamic sound is caused by unsteady change of the gas pressure (propagation phenomenon of compressional wave). For this reason, when predicting generation of aerodynamic sound by a numerical analysis, it is preferable to directly evaluate substantially unsteady changes of gas flow and changes of sound pressure associated therewith.

Accordingly, with the conventional railway wheel with BD shown in FIGS. 3A and 3B, that is, a railway wheel with BD in which a rib with a slit is added between fin portions as a target, a direct prediction of aerodynamic sound level based on transient gas flow analysis was performed. In this analysis, the travelling speed was constant at 360 km/hr.

Typical conditions for a model of railway wheel with BD which was used for the transient gas flow analysis are as follows.

<Brake Disc>
Forged steel disc for Shinkansen (R)
Inner diameter of circular plate portion: 417 mm, outer diameter of circular plate portion: 715 mm
Length from the sliding surface of the circular plate portion to the front end surface (contact surface with wheel plate portion) of the fin portion: 45 mm
12 bolt holes whose centers are located on an identical circle of a diameter of 560 mm are formed at an equal interval, and a bolt is inserted through each bolt hole to fasten the brake disc and the wheel.

<Wheel>
Rolled wheel for Shinkansen (R)
Inner diameter: 196 mm, Outer diameter: 860 mm First, measurement of aerodynamic sound level was performed by the method described in Patent Literature 2 to verify the appropriateness of the calculation method of transient gas flow analysis. Specifically, after sound pressure was measured by a precision noise meter through experiment, frequency analysis was conducted to perform an A-weighting correction, and thereafter ⅓ octave band processing was performed to calculate frequency characteristic data and an overall value. Then, for the overall value, an experimental value (114.5 [dB(A)]) and a calculated value (114.8 [dB(A)]) were compared to each other to confirm consistency therebetween.

Figure 5A:
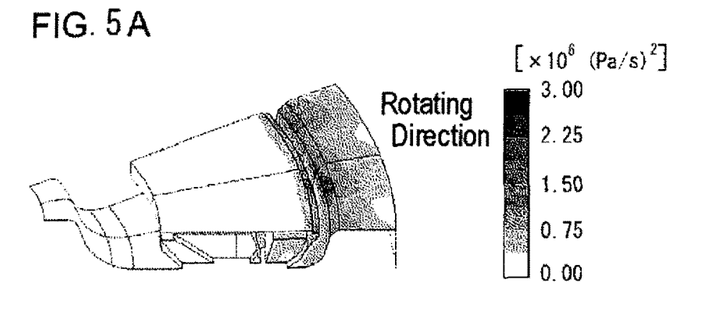
FIG. 5A is a diagram to show a distribution of gas pressure variation in a solid surface (surfaces of the brake disc and the wheel) obtained by a transient gas flow analysis.
Figure 5B:
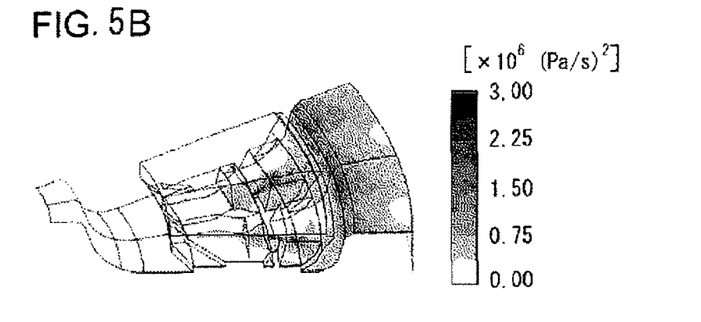
FIG. 5B is a diagram to show a distribution of gas pressure variation in a solid surface (depicted as seen through the brake disc) obtained by a transient gas flow analysis.

FIGS. 5A and 5B show the distribution of gas pressure variation on solid surfaces (surfaces of the brake disc and the wheel) obtained by a transient gas flow analysis. FIG. 5A depicts it on both of the surfaces of the brake disc and the wheel, and FIG. 5B depicts it as seen through the brake disc.

The gas pressure variation on the solid surface shown in FIGS. 5A and 5B indicates square mean quantities of time differential values of pressure, which correspond to a sound source distribution on the solid surfaces (surfaces of the brake disc and the wheel). As obvious from the distribution of dark part in the gray scale depiction in FIGS. 5A and 5B, a major sound source during travelling appears in a gas outflow region and the vicinity thereof, that is, an outer circumferential region of the circular plate portion of the brake disc and the vicinity thereof, within a space formed between the brake disc and the wheel.

For this reason, to reduce the aerodynamic sound, the present invention has paid attention, within the space formed between the brake disc and the wheel, not to the space surrounded by the circular plate portion and the fin portion of the brake disc, and the plate portion of the wheel, which was paid attention to by prior art, but to the outer circumferential region of the circular plate portion of the brake disc, which becomes a gas outflow region, that is, a region formed by the outer peripheral surface of the circular plate portion of the brake disc and the inner peripheral surface of the rim portion of the wheel.

Then, effects of the form of the outer circumferential region of the circular plate portion of the brake disc on the aerodynamic sound level and the cooling performance have been investigated by using numerical calculation by the above described transient gas flow analysis. As a result of that, the present inventors have obtained a finding that appropriately specifying the shape of the outer peripheral surface of the brake disc allows to further suppress the aerodynamic sound level while maintaining the cooling performance at a level equivalent to or not lower than that of prior art, thus completing the present invention.

In general, the abrupter the directional change of gas flow becomes, the more kinetic energy due to viscous stress is dissipated, thus becoming more likely to be converted into a type of energy that generates sound. Regarding this, the present invention has paid attention to the gas flow in the gas outflow region and adjusted the direction of gas flow from between the brake disc and the wheel so as to follow the surface (side face) of the rim portion of the wheel such that it merges, at a small angle, with the gas flow generated in a radially outward direction along the sliding surface as the brake disc rotates. As a result, the directional change of gas flow in the vicinity of the merging point, which tends to become a sound source, is minimized, thus realizing reduction of aerodynamic sound.

Hereafter, embodiments of the railway wheel with brake disc of the present invention will be described in detail.

First Embodiment

Figure 6A:
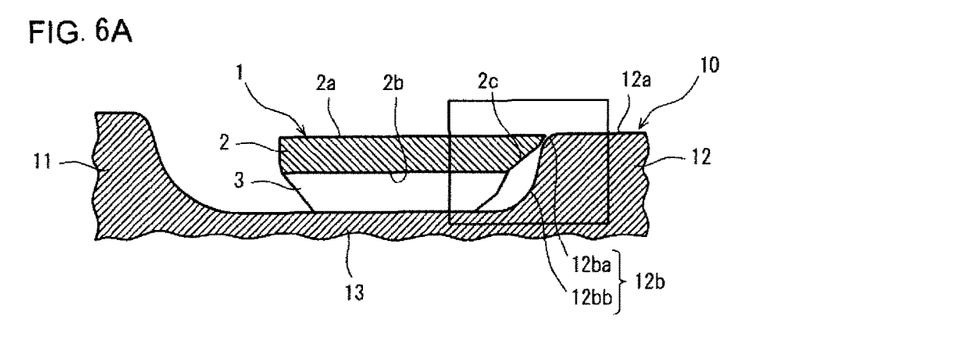
FIG. 6A is a sectional view along the radial direction to show a structure of a railway wheel with brake disc, which is a first embodiment of the present invention.
Figure 6B:
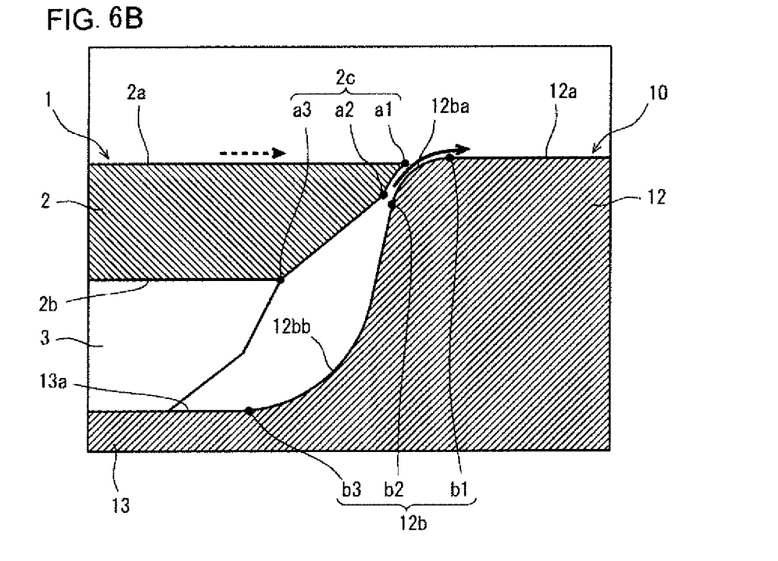
FIG. 6B is a sectional view to topically show the railway wheel with brake disc of FIG. 6A, showing the rectangular region in FIG. 6A.

FIG. 6A is a sectional view along the radial direction to show a structure of a railway wheel with brake disc, which is a first embodiment of the present invention. FIG. 6B is a sectional view to topically show the railway wheel with brake disc of FIG. 6A, showing the rectangular region in FIG. 6A. Hereafter, parts common to those of the conventional railway wheel with BD shown in FIGS. 1A, 1B, and 2A to 2C are given the like symbols, thereby appropriately omitting overlapping description.

As shown in FIGS. 6A and 6B, a brake disc 1 in the first embodiment includes a circular plate portion 2 and a fin portion 3. This brake disc 1 does not include the rib 7 as shown in FIGS. 3A and 3B. That is, only a plurality of fin portions 3 are projected in a radial manner on a back face 2b of the circular plate portion 2.

The material of the brake disc 1 can adopt cast iron, cast steel, forged steel, aluminum, carbon, and the like.

Note that strictly speaking, a region in a front face 2a of the brake disc 1, which provides a sliding surface, is raised one step higher. The brake disc 1 is to be replaced when the sliding surface has been worn due to repetitive braking and the wear of the sliding surface has progressed to a height of the front face 2a of the circular plate portion 2.

A wheel 10 includes a boss portion 11, a rim portion 12, and a plate portion 13. The inner peripheral surface 12b (a range from point b1 to point b3 in FIG. 6B) of the rim portion 12 includes a corner surface 12ba (a range from point b1 to point b2 in FIG. 6B) which connects to the side face 12a of the rim portion 12, and a fillet surface 12bb (a range from point b2 to point b3 in FIG. 6B) which connects to the corner surface 12ba and the side face 13a of the plate portion 13.

The shapes of the corner surface 12ba and the fillet surface 12bb are designed according to the specification of the vehicle. For example, the corner surface 12ba is a single round face whose contour shape in a section along the axial direction of the wheel 10 is an arc shape, and whose radius of curvature is constant. The fillet surface 12bb is a complex plane in which a tapered surface of a frusto-conical shape and a round face having a constant radius of curvature are combined, and whose contour shape in a section along the axial direction of the wheel 10 is a combined shape of a straight line and an arc. But, the fillet surface 12bb may be a single round face, or a free curved surface whose radius of curvature varies.

Here, in the railway wheel with BD of the first embodiment, regarding a spatial cross section which crosses along the circumferential direction the space formed between the brake disc 1 and the wheel 10, a minimum section portion in which the area of the spatial cross section is minimum, is present in a region formed by the outer peripheral surface 2c of the circular plate portion 2 of the brake disc 1 and the inner peripheral surface 12b of the rim portion 12 of the wheel 10. Specifically, it is present at a boundary b2 between the corner surface 12ba and the fillet surface 12bb within the inner peripheral surface 12b of the rim portion 12.

Corresponding to this, the outer peripheral surface 2c (a range from point a1 to point a3 in FIG. 6B) of the circular plate portion 2 of the brake disc 1 is configured such that the shape of a region (a range from point a1 to point a2 in FIG. 6B) extending from a position a2, which faces the boundary b2 between the corner surface 12ba and the fillet surface 12bb of the rim portion 12, to the outer side (the front face 2a side) along the thickness direction corresponds to a shape that follows the corner surface 12ba within the inner peripheral surface 12b of the rim portion 12. That is, in the range of that region, the outer peripheral surface 2c of the circular plate portion 2 of the brake disc 1 and the inner peripheral surface 12b of the rim portion 12 of the wheel 10 are opposed in proximity to each other. Proximity as used herein means that there is a gap of about 1 to 5 mm. On the other hand, in a region (a range from point a2 to point a3 in FIG. 6B) extending to the inner side (the back face 2b side of the brake disc 1) away from the aforementioned region, the outer peripheral surface 2c of the circular plate portion 2 extends apart from the inner peripheral surface 12b of the rim portion 12 without following it.

In a railway wheel with BD having such a configuration, the brake disc 1 includes no rib 7, only including a fin portion 3 on the back face of the circular plate portion 2, and therefore has a simple shape. For this reason, the production process of the brake disc 1 will not become complicated, and the productivity of the brake disc 1 is excellent. Even when a brake disc 1 is produced by forging, the load imposed on the die will not increase, and the die life will not be shortened. It is also noted that although the outer peripheral surface 2c of the circular plate portion 2 of the brake disc 1 needs to be machined into a shape conforming to the shape of the inner peripheral surface 12b of the rim portion 12 of the wheel 10, this machining can be simply performed in a series of machining of the brake disc 1, in contrast to the additional work of conventional ribs and slits.

Further, according to the railway wheel with BD of the first embodiment, the air that flows between the brake disc 1 and the wheel 10 during high speed travelling flows out (see solid arrows in FIG. 6B) so as to finally follow the side face 12a of the rim portion 12 while following the inner peripheral surface 12b (the corner surface 12ba) of the rim portion 12. For this reason, the air that flows out between the brake disc 1 and the wheel 10 tends to merge at a small angle with a gas flow (see broken line arrows in FIG. 6B) generated in a radially outward direction along the sliding surface as the brake disc 1 rotates. Since this will minimize the directional change of the gas flow in the vicinity of the merging point which tends to become a sound source, the aerodynamic sound is effectively reduced.

Second Embodiment

Figure 7A:
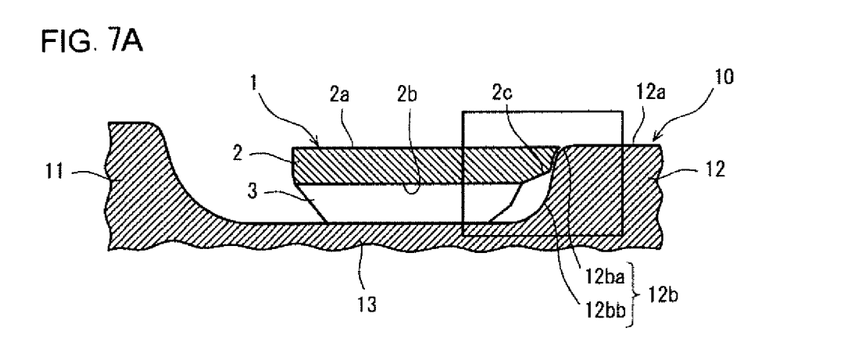
FIG. 7A is a sectional view along the radial direction to show a structure of a railway wheel with brake disc, which is a second embodiment of the present invention.
Figure 7B:
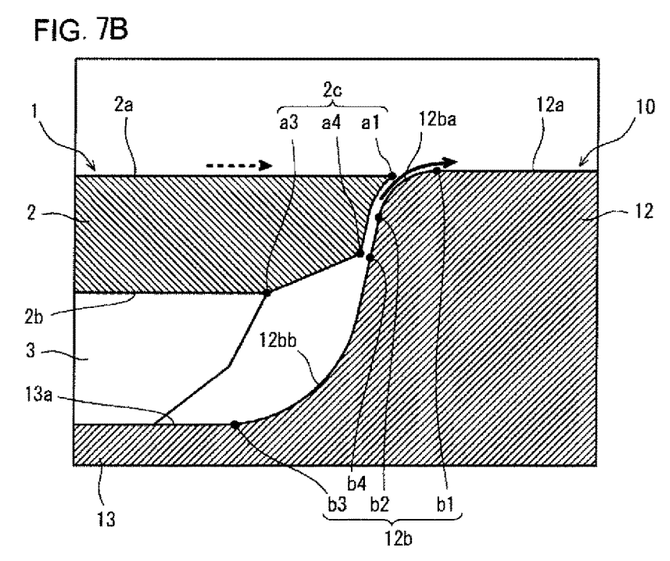
FIG. 7B is a sectional view to topically show the railway wheel with brake disc of FIG. 7A, showing the rectangular region in FIG. 7A.

FIG. 7A is a sectional view along the radial direction to show a structure of a railway wheel with brake disc, which is a second embodiment of the present invention. FIG. 7B is a sectional view to topically show the railway wheel with brake disc of FIG. 7A, showing the rectangular region in FIG. 7A. The railway wheel with BD of the second embodiment is based on the configuration of the first embodiment, and is subjected to change in the following points with respect to the first embodiment.

In the railway wheel with BD of the second embodiment, a minimum section portion of the spatial cross section between the brake disc 1 and the wheel 10 is present in a region of the fillet surface 12bb of the rim portion 12 (see point b4 in FIG. 7B) within the region formed by the outer peripheral surface 2c of the circular plate portion 2 of the brake disc 1 and the inner peripheral surface 12b of the rim portion 12 of the wheel 10.

Corresponding to this, the outer peripheral surface 2c (a range from point a1 to point a3 in FIG. 7B) of the circular plate portion 2 of the brake disc 1 is configured such that the shape of a region (a range from point a1 to point a4 in FIG. 7B) extending from a position a4, which faces the minimum section portion (point b4 in FIG. 7B) in the fillet surface 12bb of the rim portion 12, to the outer side (the front face 2a side) along the thickness direction corresponds to a shape that follows parts of the corner surface 12ba and the fillet surface 12bb within the inner peripheral surface 12b of the rim portion 12. That is, in the range of that region, the outer peripheral surface 2c of the circular plate portion 2 of the brake disc 1 and the inner peripheral surface 12b of the rim portion 12 of the wheel 10 are opposed in proximity to each other. On the other hand, in a region (a range from point a4 to point a3 in FIG. 7B) extending to the inner side (the back face 2b side of the brake disc 1) away from the aforementioned region, the outer peripheral surface 2c of the circular plate portion 2 extends apart from the inner peripheral surface 12b of the rim portion 12 without following it.

The railway wheel with BD of the second embodiment having such configuration achieves the same effects as those of the first embodiment as described above.

Third Embodiment

Figure 8A:
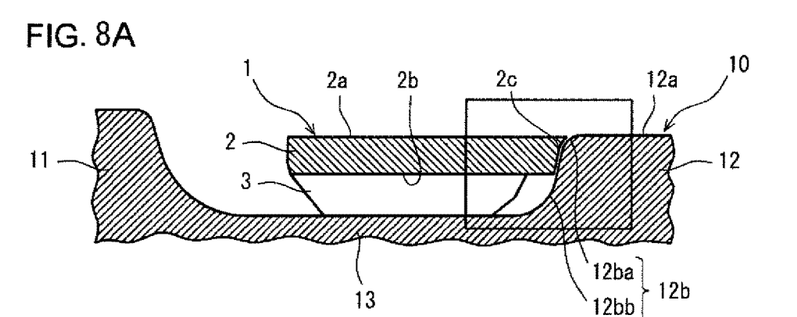
FIG. 8A is a sectional view along the radial direction to show a structure of a railway wheel with brake disc, which is a third embodiment of the present invention.
Figure 8B:
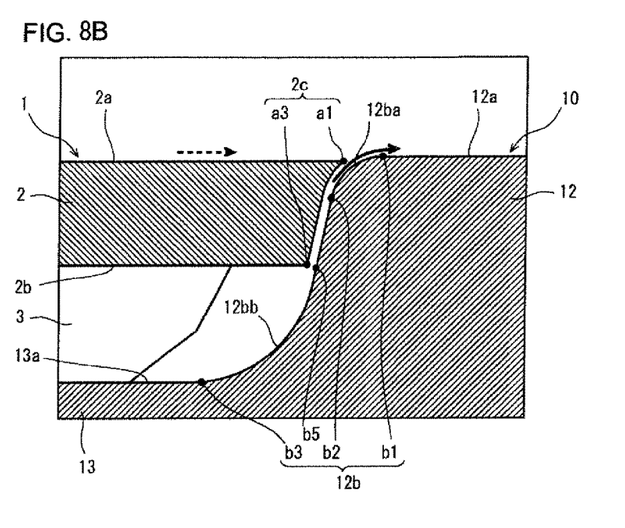
FIG. 8B is a sectional view to topically show the railway wheel with brake disc of FIG. 8A, showing the rectangular region in FIG. 8A.

FIG. 8A is a sectional view along the radial direction to show a structure of a railway wheel with brake disc, which is a third embodiment of the present invention. FIG. 8B is a sectional view to topically show the railway wheel with brake disc of FIG. 8A, showing the rectangular region in FIG. 8A. The railway wheel with BD of the third embodiment is a modified aspect of the second embodiment.

That is, in the railway wheel with BD of the third embodiment, a minimum section portion of the spatial cross section between the brake disc 1 and the wheel 10 is present closest to the back face 2b (see point a3 in FIG. 8B) within the outer peripheral surface 2c of the circular plate portion 2, in the region formed by the outer peripheral surface 2c of the circular plate portion 2 of the brake disc 1 and the inner peripheral surface 12b of the rim portion 12 of the wheel 10.

The outer peripheral surface 2c (a range from point a1 to point a3 in FIG. 8B) of the circular plate portion 2 of the brake disc 1 is configured such that the shape of a region extending from a position a3, which is closest to the back face 2b, to the outer side (the front face 2a side) along the thickness direction corresponds to a shape that follows substantially entire surface of the corner surface 12ba and part of the fillet surface 12bb within the inner peripheral surface 12b of the rim portion 12. That is, the outer peripheral surface 2c of the circular plate portion 2 of the brake disc 1 is opposed in proximity to the inner peripheral surface 12b of the rim portion 12 of the wheel 10 over the entire range in the thickness direction.

In this case, the minimum section portion of the spatial cross section between the brake disc 1 and the wheel 10 is present in a region of the fillet surface 12bb of the rim portion 12 of the wheel 10 corresponding to the position a3 closest to the back face 2b (see point b5 in FIG. 8B) within the outer peripheral surface 2c of the circular plate portion 2 of the brake disc 1.

The railway wheel with BD of the third embodiment having such configuration achieves the same effects as those of the first embodiment as described above.

EXAMPLES

To confirm the effects by the railway wheel with BD of the present invention, a transient gas flow analysis and a heat transfer and flow analysis were performed to evaluate the aerodynamic sound level, cooling performance, and air flow rate. As the target of analysis, the railway wheel with BD of the first embodiment shown in FIGS. 6A and 6B was adopted as Inventive Example 1 of the present invention, and the railway wheel with BD of the third embodiment shown in FIGS. 8A and 8B was adopted as Inventive Example 2 of the present invention.

Figure 9A:
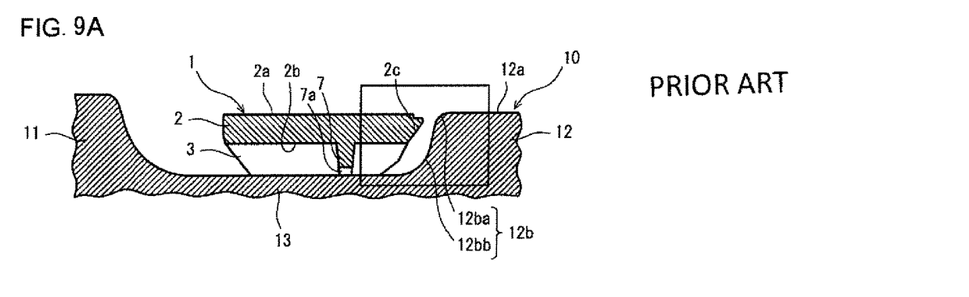
FIG. 9A is a sectional view along the radial direction to show a structure of a railway wheel with brake disc, which is used as Comparative Example in the analysis of Examples.
Figure 9B:
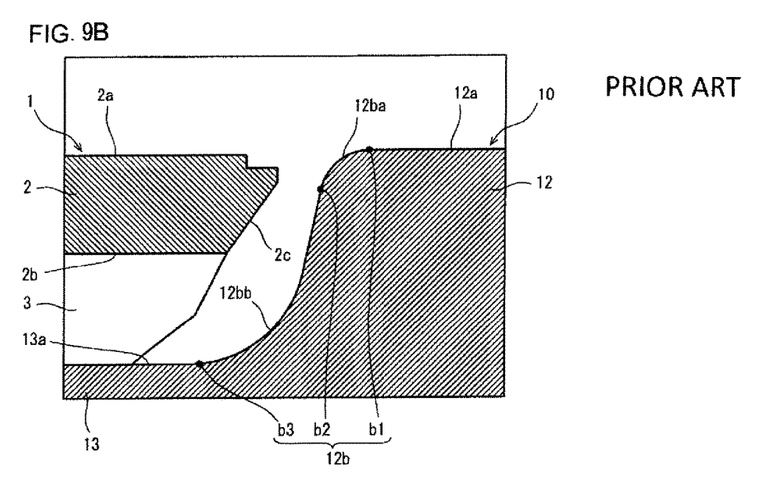
FIG. 9B is a sectional view to topically show the railway wheel with brake disc of FIG. 9A, showing the rectangular region in FIG. 9A.

Further, as Comparative Example, a railway wheel with BD was adopted in which a rib 7 with a slit 7a between fin portions 3 was added as shown in FIGS. 9A and 9B. The railway wheel with BD shown in FIGS. 9A and 9B is the same as the conventional railway wheel with BD shown in FIGS. 3A and 3B. In the railway wheel with BD of Comparative Example, the outer peripheral surface 2c of the circular plate portion 2 of the brake disc 1 extends apart from the inner peripheral surface 12b of the rim portion 12 without following it.

In all of the railway wheels with BD of Inventive Examples 1 and 2 of the present invention and Comparative Example, the brake disc was center fastened.

Typical conditions for a model of the railway wheel with BD which was used for analysis were the same as those in the above described transient gas flow analysis. Also, the technique for transient gas flow analysis was the same as described above. The traveling speed was assumed to be constant at 360 km/h either in the transient gas flow analysis and the heat transfer and flow analysis.

As an evaluation index for cooling performance, a heat dissipation rate was introduced, the heat dissipation rate being defined as a product of an average heat transfer coefficient of surface and a surface area per one brake disc. The larger the heat dissipation rate is, the better the cooling performance is.

The evaluation of air flow rate was performed by a time average of air flow rate and a variation range thereof in the minimum section portion of the spatial cross section between the brake disc and the wheel.

The results are shown in the following Table 1, and FIGS. 10 and 11.

TABLE 1

| Category | Area of minimum section portion [mm$^2$] | Aerodynamic sound level [dB(A)] | Heat dissipation rate [W/K] | Average air flow rate [kg/s] | Variation range of air flow rate [kg/s] |
|---|---|---|---|---|---|
| Inventive Example 1 | 4560 | 112.0 | 66.7 | 0.24 | 0.0033 |
| Inventive Example 2 | 4560 | 111.0 | 65.9 | 0.21 | 0.0027 |
| Comparative Example | 2630 | 114.8 | 58.8 | 0.14 | 0.0190 |

Figure 10:
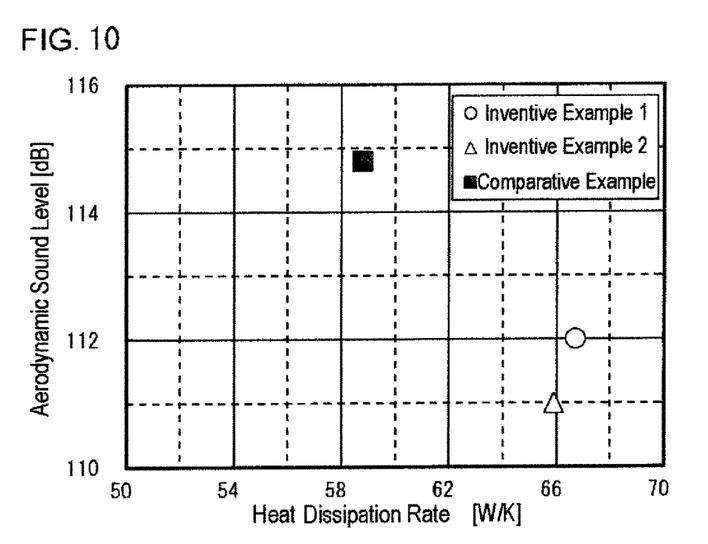
FIG. 10 is a diagram to show relationship between the heat dissipation rate, which is an analysis result of Examples, and the aerodynamic sound level.
Figure 11:
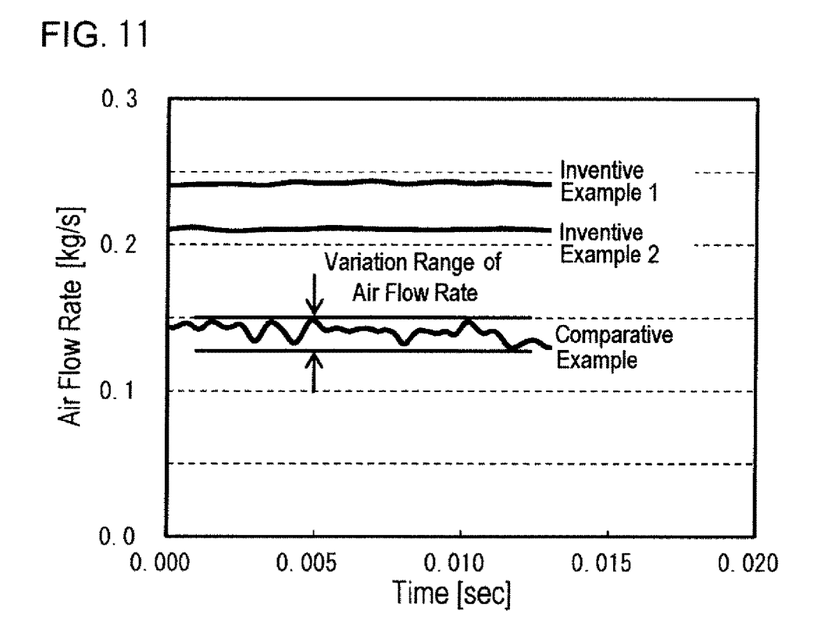
FIG. 11 is a diagram to show temporal changes of air flow rate which are analysis results of Examples.

FIG. 10 is a diagram to show relationship between the heat dissipation rate, which is an analysis result of Examples, and the aerodynamic sound level. FIG. 11 is a diagram to show temporal changes of air flow rate which are analysis results of Examples. As shown in Table 1 and FIG. 10, it can be confirmed that Inventive Examples 1 and 2 of the present invention can reduce the aerodynamic sound level further than Comparative Example while achieving a cooling performance equal to or better than that of Comparative Example. Moreover, since Inventive Examples 1 and 2 each have a larger area of the minimum section portion than that of Comparative Example, they exhibit increased average air flow rate, thus achieving higher cooling performance. Furthermore, as shown in Table 1 and FIG. 11, Inventive Examples 1 and 2 each exhibit a smaller variation range of air flow rate than that of Comparative Example, and therefore improved quietness. From these, it can be said that the quietness of a railway wheel with BD and the cooling performance of brake disc during braking can be appropriately controlled by properly changing the area of the minimum section portion, which is a design factor.

INDUSTRIAL APPLICABILITY

The railway wheel with brake disc of the present invention can be effectively utilized for every railway vehicle equipped with a disc brake, and is particularly useful for high speed railway vehicles.

REFERENCE SIGNS LIST

1: Brake disc, 2: Circular plate portion,
2a: Front face, 2b: Back face,
2c: Outer peripheral surface, 3: Fin portion,
4: Bolt hole, 5: Bolt, 6: Nut,
7: Rib, 7a: Slit, 10: Wheel,
11: Boss portion, 12: Rim portion,
12a: Side face, 12b: Inner peripheral surface,
12ba: Corner surface, 12bb: Fillet surface,
13: Plate portion, 13a: Side face

The invention claimed is:

1. A railway wheel and brake disc assembly for a railway vehicle, the assembly comprising:
   a railway wheel comprising a boss portion, a rim portion, and a plate portion for combining them together; and
   two brake discs, each brake disc comprising an annular circular plate portion whose front face provides a sliding surface, and a plurality of fin portions which are axially projected on and radially extended along a back face of the annular circular plate portion, wherein
   the plate portion of the wheel being disposed between the two brake discs with each of the sliding surfaces of the two brake discs thereof facing outwardly, each of the two brake discs being fastened within a region defined by the sliding surface of each brake disc viewed in an axial direction of the railway wheel, and wherein
   for an area of a section crossing a space formed between each brake disc and the wheel, the space extending along a radial direction, for each brake disc, a minimum section portion in which a sectional area is minimum is present in a region formed by an outer peripheral surface of the annular circular plate portion and an inner peripheral surface of the rim portion, and
   the outer peripheral surface of the annular circular plate portion has a shape that is parallel to the inner peripheral surface of the rim portion in a region extending from the minimum section portion to an axially outermost portion of the annular circular plate portion.

2. The railway wheel and brake disc assembly for a railway vehicle according to claim 1, wherein
   the inner peripheral surface of the rim portion includes a corner surface connecting to a side face of the rim portion, and a fillet surface connecting to the corner surface and a side face of the plate portion, and
   the minimum section portion is present at a boundary between the corner surface and the fillet surface within the inner peripheral surface of the rim portion.

3. The railway wheel and brake discs assembly for a railway vehicle according to claim 2, wherein
   the corner surface in the inner peripheral surface of the rim portion has a contour of arc shape in a section along the axial direction.

4. The railway wheel and brake disc assembly for a railway vehicle according to claim 1, wherein
   the inner peripheral surface of the rim portion includes a corner surface connecting to a side face of the rim portion, and a fillet surface connecting to the corner surface and a side face of the plate portion, and the minimum section portion is present in a region of the fillet surface within the inner peripheral surface of the rim portion.

5. The railway wheel and brake disc assembly for a railway vehicle according to claim 4, wherein
the corner surface in the inner peripheral surface of the rim portion has a contour of arc shape in a section along the axial direction.

6. The railway wheel and brake disc assembly for a railway vehicle according to claim 4, wherein
the minimum section portion is present at the back face within the outer peripheral surface of the annular circular plate portion.

7. The railway wheel and brake disc assembly for a railway vehicle according to claim 6, wherein
the corner surface in the inner peripheral surface of the rim portion has a contour of arc shape in a section along the axial direction.

* * * * *